United States Patent [19]

Wanlass

[11] 4,187,457
[45] Feb. 5, 1980

[54] POLYPHASE ELECTRIC MOTOR HAVING CONTROLLED MAGNETIC FLUX DENSITY

[76] Inventor: Cravens L. Wanlass, 9871 Overhill Dr., Santa Ana, Calif. 92705

[21] Appl. No.: 790,758

[22] Filed: Apr. 25, 1977

Related U.S. Application Data

[63] Continuation-in-part of Ser. No. 597,529, Jul. 21, 1975, Pat. No. 4,063,135.

[51] Int. Cl.² ............................................... H02F 1/44
[52] U.S. Cl. ...................................... 318/729; 318/812
[58] Field of Search ............... 318/200, 220 A, 220 R, 318/221 R, 221 D, 225 R, 222, 228, 729, 812

[56] References Cited

U.S. PATENT DOCUMENTS

| | | | |
|---|---|---|---|
| 1,478,012 | 12/1923 | Varley | 318/228 X |
| 1,595,937 | 8/1926 | Hobart | 318/228 |
| 1,978,581 | 10/1934 | Johnson | 318/228 |
| 2,039,050 | 4/1936 | Ball | 318/228 X |

FOREIGN PATENT DOCUMENTS 462172  2/1951  Italy .......................................... 318/200

*Primary Examiner*—Gene Z. Rubinson
*Attorney, Agent, or Firm*—Lyon & Lyon

[57] ABSTRACT

A polyphase motor is disclosed in which each coil of the stator winding of, for example, a squirrel cage induction motor, is connected in series with a capacitor so that the capacitor, together with the input voltage, causes the stator core to periodically switch from a nonsaturated to a saturated condition and vice-versa so that the flux density is maintained at a uniform high level. A second set of stator coils may be provided which serves to provide increased starting torque and improve the overall operating characteristics of the motor.

52 Claims, 8 Drawing Figures

POLYPHASE ELECTRIC MOTOR HAVING CONTROLLED MAGNETIC FLUX DENSITY

RELATED APPLICATION

This is a continuation-in-part of my application Ser. No. 597,529, filed July 21, 1975, now U.S. Pat. No. 4,063,135 entitled "Electric Motor Having Controlled Magnetic Flux Density"; the disclosure of which is incorporated by reference herein.

BACKGROUND OF THE INVENTION

Present day induction motors such as the squirrel cage type have numerous limitations. For example, when heavily loaded, they draw excessive currents as the rotor slows down, which currents can result in motor burn out unless the motor is protected by auxiliary equipment. Such motors must have a high breakaway torque to running torque ratio to prevent motor damage in the event of motor overload, and as a result the flux density must be maintained at considerably less than saturation levels. This relatively low flux density during normal operation is also necessitated by potential input voltage variations. Because the flux density must be kept relatively low, the motor size must be substantially larger than would theoretically be necessary in an ideal motor in order to obtain the desired output horsepower. In addition, the output horsepower available from such motors is significantly dependent on the line voltage, and to some extent, line frequency. Another problem encountered in conventional induction motors is the high starting currents inherent in their operation. Ordinarily, in motors of any size, external current limiting devices must be used, or special and expensive rotor designs employed. Similar problems exist with regard to polyphase motors.

SUMMARY OF THE INVENTION

The present invention overcomes or reduces the foregoing disadvantages of conventional electric motors by providing a system in which the magnetic flux density in the stator is maintained at a maximum level. In addition, the system permits the current in the rotor also to be maintained at a large magnitude relative to those permitted in conventional electric motors of the induction type. Since the force generated in a conductor is defined by the equation:

$$F = BlI$$

where F = force
where B = flux density
where l = length of the conductor
where I = current in the conductor it can be seen that maximizing the terms B and I for a given l maximizes the force and consequently the torque and horsepower of a motor.

According to the present invention, flux density is maximized by controlling the flux density in the stator core by means of a capacitor coupled in series with the main stator winding, the capacitor having a value such that the voltage stored therein will, in combination with the input voltage, periodically cause the volt-second capacity of the stator core to be exceeded with the result that the core will periodically change non-linearly from a nonsaturated to a saturated condition and back again. The average flux density in the stator core is thus maintained quite high without the danger of high input voltages resulting in extremely high input currents. The capacitor limits the amount of energy that can be transferred to the rotor even if the rotor has a very low impedance so rotor current can also be maximized. The rotor inductance can be made lower than in a conventional motor and the current induced at zero motor speed can be made greater than is conventional; yet this current will still have proper value at normal motor operating speeds and normal loads. Thus, the motor of the present invention can be optimized much better than conventional motors for a large number of applications or for any given application.

By using a capacitor in series with the motor stator winding and operating the motor magnetic path in soft saturation due to the limiting effect of total energy transfer of the capacitor, the end result is a motor that can be operated at maximum flux density under most conditions of line voltage without resulting in extremely high input currents for high input voltages. In other words, the input current and flux density in the device would not be extremely non-linear as a function of the line voltage as is presently the case with conventional AC induction and other motors. The present invention makes use of the fact that the inductances of the motor winding can only absorb so much energy before the magnetic material of the motor stator saturates and discharges the capacitor. When the motor magnetic material saturates, the capacitor discharges through the motor winding and the power line source and charges up the capacitor in the opposite polarity. The current through the winding then reverses and the capacitor is then the source of energy and maintains the current flowing through the winding. This continues until the voltage of the input line changes in polarity. The volt-seconds of the input voltage from the line then adds to the volt-seconds that have been applied by the capacitor to the motor winding. This continues until the total volt-seconds applied to the motor winding exceeds the volt-second capacity of the winding and magnetic material of the motor stator, and then the magnetic material of the motor again saturates. The capacitor then discharges through the motor winding since it has saturated and the line power source charges up the capacitor in the opposite polarity again. The current then reverses once more through the motor winding and the capacitor again provides the source of current through the motor winding. This continues until the line voltage again changes polarity. As the line voltage amplitude continues to increase the volt-second of the line voltage plus that of the capacitor again are in phase and add until the volt-second capacity of the motor winding and its associated magnetic material are exceeded. The winding magnetic material again saturates and the inductance of the motor winding decreases considerably again causing the capacitor to discharge through the winding. This process is repeated each half-cycle and results in the motor running at maximum flux density and thus maximum force, torque and horsepower.

The use of the present invention allows for maximum flux density and since the voltage across the capacitor is usually much higher (although it need not be) than the line voltage, the flux density in the stator core is relatively independent of the line voltage over fairly wide ranges of amplitude. Furthermore, the capacitor prevents excessive currents from passing through the motor winding when the magnetic material saturates since only the energy in the capacitor, i.e., $\frac{1}{2}CV^2$, can be transferred through the winding. This limited energy transfer prevents excessive currents from the line through the motor winding.

The result is an AC motor that will operate over wide ranges of input voltage and operate at high efficiency and possess excellent operating characteristics. Since the capacitor limits the amount of energy transferred through the motor winding each half cycle, motor burn out is not normally possible. In the case of motor overload all that will occur is that the motor will stall and the input power to the motor will be greatly reduced. This is due to the fact that the series capacitor will have a much lower voltage across it than normal since the motor is not operating in the controlled phase, and the $\frac{1}{2} CV^2$ energy level is greatly reduced.

The present invention can also be applied to polyphase AC motors by connecting a suitable capacitor in series with each of the coils making up a single phase of the polyphase stator winding.

It has been found that even better operating characteristics can be achieved if an auxiliary winding is provided on the stator core, this auxiliary winding being connected in parallel with the main winding and capacitor. It has been found that the auxiliary winding provides the necessary rotating field for starting a single phase motor and in addition provides considerably more starting torque for the motor. It has further been found that once the motor is up to rated speed at rated load, the auxiliary winding plays no appreciable part in the operation of the motor. If, however, the load increases, the auxiliary winding once again draws current, acts as a motor winding, and provides additional torque to the motor. In the event of a substantial overload, the motor will still stall without the damage due to large currents but as soon as the load is removed the motor will again come up to speed. This auxiliary winding is usually much greater in impedance than the main winding and therefore the current through the auxiliary winding is relatively low compared, for example, with the main winding of an induction motor.

Furthermore, the auxiliary winding serves to limit the input current, because as the input voltage increases, or the motor speed increases, this winding begins to act as a generator winding due to the back e.m.f. exceeding the input voltage, and generates a current which counteracts some of the current drawn by the main winding. This, of course, is made possible by the fact that the main winding is the primary source of power to the motor. One or more auxiliary windings can be used in the case of a polyphase motor.

DESCRIPTION OF THE INVENTION

Figure 1:
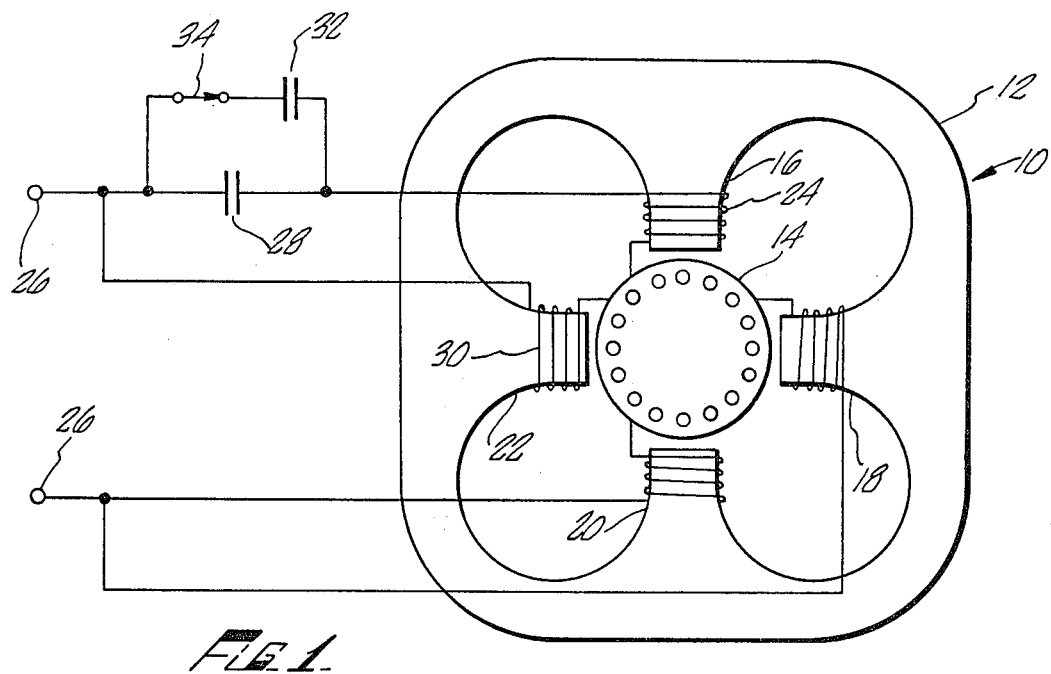
FIG. 1 is a schematic diagram of a preferred embodiment of a single phase motor according to the present invention.

FIG. 1 illustrates in schematic form the preferred embodiment of the present invention. An AC induction motor of the squirrel cage type is generally indicated at 10 and is diagrammatically shown to have a stator 12 of magnetic material and a squirrel cage rotor 14. The stator is shown as having four pole pieces, 16, 18, 20 and 22 although more or less pole pieces may be used if desired, as will be apparent to those skilled in the art. It will also be apparent to those skilled in the art that the configuration of the pole pieces shown is diagrammatic only. In most applications, it would probably be desirable to provide the pole pieces with a constriction so that saturation would occur at these points only. No attempt is made herein to optimize the physical construction of the motor. The main stator winding 24 is shown as wound on poles 16 and 20 and is connected to input terminals 26 by means of a series capacitor 28. The capacitor 28 need have no particular value, but its capacitance must be large enough to maintain a capacitive power factor in the series circuit comprising this capacitor and the winding 24 during the motor's normal operating mode. An auxiliary winding 30 is wound on pole pieces 18 and 22 and is connected in parallel with winding 24 and capacitor 28. The winding 30 is preferably of considerably higher inductance and impedance than the winding 24. It may, for example, have considerably more turns of finer wire. A starting capacitor 32 is connected across the capacitor 28 by a centrifugal switch 34.

The operation of the motor shown in FIG. 1 is as described above. Briefly, when an AC voltage is applied to the terminals 26, the capacitor 28 begins to charge and a current flows through the winding 24. A current also flows through the winding 30 which is out of phase with the primarily capacitive current in the winding 24 with the result that a rotating field is created which causes the rotor 14 to begin rotating. At this time, a substantial amount of the driving force is produced by the winding 30 inasmuch as the main winding 24 and capacitor 28 has not yet entered into its normal operating mode. As the rotor speed and the back e.m.f. increase, the effective inductance of the winding 24 becomes such that this winding 24, together with the capacitor 28, goes into its operating mode. In other words, the effective volt-second capacity of the winding 24 and its associated magnetic material becomes sufficiently large to permit the operation of the device in the manner described previously, i.e., the capacitor 28 will periodically charge, discharge and recharge in the opposite direction causing the magnetic material associated with the winding 24 to switch from a non-saturated to a saturated condition while maintaining the average flux density quite large.

As the rotor approaches rated speed, the current in the auxiliary winding 30 becomes less and less. Preferably, this winding is designed to have minimum current at rated speed and load and nominal input voltage. In the event the load should increase or the speed otherwise decrease, the winding 30 will draw more current and again contribute to the driving force of the motor. This is very desirable as it provides additional torque for periods of overload, which overload, if the winding 30 was not present, might cause the capacitor 28 and winding 24 to be driven out of its operating mode and the motor to stall.

The capacitor 32, while not necessary, is helpful for increasing starting torque by initially allowing more current to flow through the main winding 24. After the motor reaches a predetermined speed, the centrifugal switch 34 opens, removing the capacitor 32 from the circuit.

The advantages of the present invention can be seen from the following example. A Dayton squirrel cage induction motor Model 5K989A rated at ¼ horsepower at 1725 RPM was modified in accordance with the present invention by connecting a 70 microfarad capacitor in series with the main stator winding, the capacitor running at 180 to 190 volts. The start winding was used as the auxiliary winding and was connected directly across the input line, i.e., the centrifugal switch normally employed in the start winding circuit was bypassed. This switch was then used to connect an additional start capacitor of 120 microfarads (the capacitor 32 in FIG. 1) into the circuit. No internal modifications were made to the motor. Before modification, the efficiency of the motor, i.e., power out to power in, at rated load and speed was about 35%; after modification, at the same speed and load, the efficiency was approximately 60%. In addition, because of the larger internal losses of the unmodified motor, operation at higher output power levels which would theoretically produce greater efficiency is not possible for any significant period of time because the motor would overheat and possibly burn out. Because the internal losses of the modified motor are less, the same motor may be operated at considerably higher power output levels with a corresponding increase in efficiency. Thus the modified motor was operated to produce 0.4 horsepower at which level it had an efficiency of about 75% without any overheating. In fact, the power dissipated internally in the modified motor under these conditions was less than that dissipated in the unmodified motor at rated conditions.

In the unmodified motor, at no load, the input current at an input voltage of 120 volts is approximately 6.3 amps, the rated current of the motor. At 140 volts, however, the current rises to over 9.0 amps and rises rapidly with additional input voltage so that motor burn out would occur. The modified motor had a current of about 3.4 amps at 120 volts input, and was approximately the same at 140 volts, the curve being almost flat beyond that point.

The starting torque of the modified motor was somewhat less than the unmodified motor, but was entirely adequate for input voltages greater than 80 volts. This starting torque could be increased by increasing the capacitance of the start capacitor 32. The motor of the present invention is thus unlike a split-phase motor in that it has adequate starting torque at all normal line voltages and for all normal applications, even without additional starting capacitance.

The same Dayton motor was then again modified to substitute a 100 microfarad capacitor for the 70 microfarad capacitor (the capacitor 28), the capacitor again running at about 180 to 190 volts. In this case, motor efficiency was found to be about 51% at rated load and speed, and again the motor could be run at higher output levels without danger of burn out, e.g., at approximately 0.4 horsepower, with an efficiency of about 75%. The input current at 120 volts was about 5.1 amps and rose to about 5.3 amps at 140 volts with the current rise being quite gradual for higher coltages. The starting torque of the motor as modified in this example was still less than the unmodified motor, but was greater than that of the modified motor of example 1.

Figure 2:
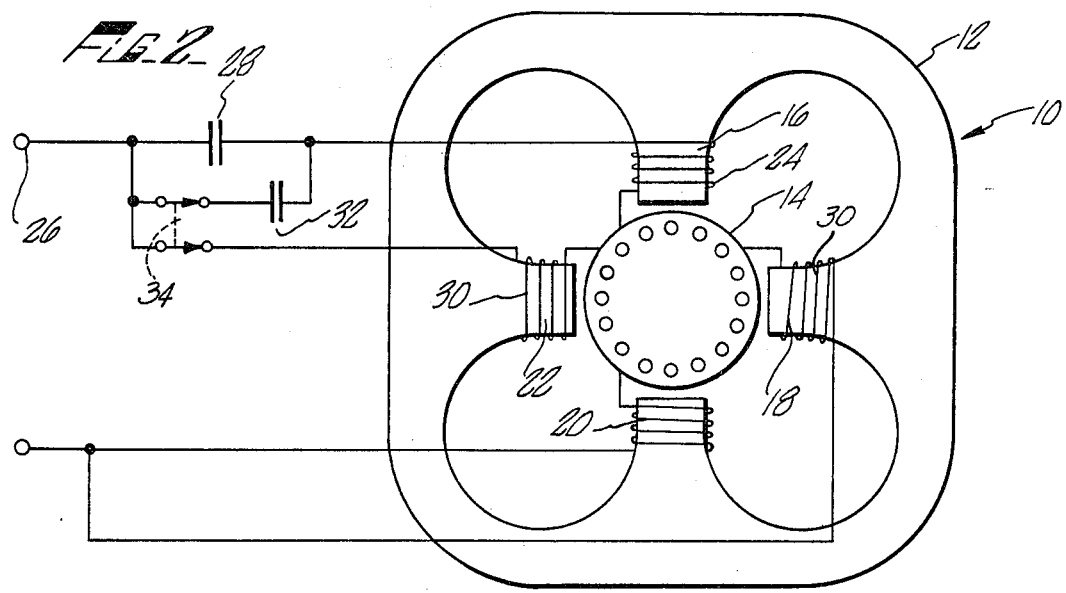
FIG. 2 is a schematic diagram of a modification of the embodiment of FIG. 1.

FIG. 2 shows a modification of the motor of FIG. 1, with the same reference numerals being used for the same elements. As can be seen, the centrifugal switch 34 now acts to remove both the start capacitor 32 and the auxiliary winding 30 from the circuit after the motor gets up to speed. This circuit may be used where it is desirable that the motor stall on overload and not start again until the overload condition is corrected. In such a case, the centrifugal switch 34 may be of the conventional type that will not re-close until the power has been removed. While the start capacitor 32 is not necessary to the operation of the motor, the auxiliary winding 30 must be present in a single phase motor in order that a rotating field can be created to start the motor. Once the motor has gotten up to a speed sufficient to enable the capacitor 28-winding 24 circuit to go into its operating mode, the winding 30 is no longer necessary to the operation of the motor, although it is generally desirable.

The present invention can equally well be used in connection with three phase or other polyphase motors with one capacitor being provided per phase. FIGS. 3 through 8 illustrate in schematic form various embodiments of three phase motors according to the present invention. In each of FIGS. 3 through 8, the three coils making up the main stator winding are designated 24a, 24b and 24c while the three capacitors connected in series with these coils are designated 28a, 28b and 28c, respectively. In the case of such polyphase motors, no starting winding is necessary, but the use of an auxiliary winding is still beneficial for the reasons previously stated. FIGS. 3, 4, 5 and 6 show such auxiliary windings, one winding or coil for each phase, these coils being designated as 30a, 30b and 30c. Although three auxiliary windings are illustrated, it appears that only one such winding would be necessary to obtain many of the benefits desired. In each figure, the windings are shown connected to appropriate input terminals A, B, C and D which correspond to the input terminals 26 in FIGS. 1 and 2 except, of course, that they are adapted to be connected to a source of three phase voltage rather than single phase voltage.

Figure 3:
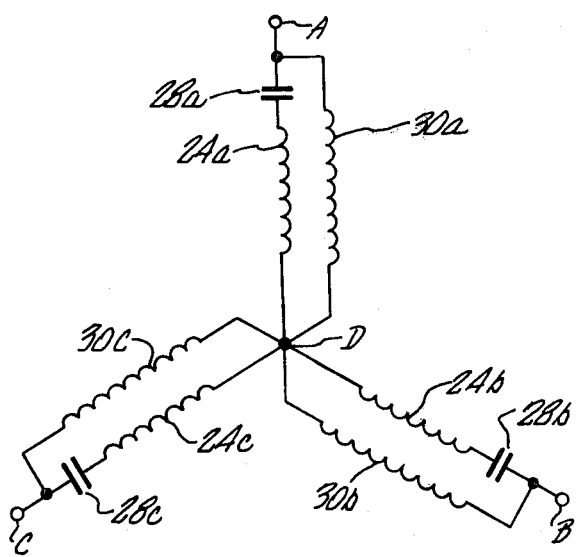
FIG. 3 is a schematic diagram of a first embodiment of a polyphase motor according to the present invention.
Figure 4:
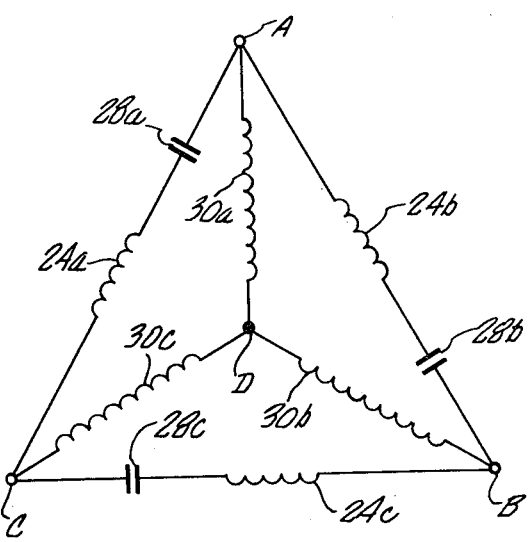
FIG. 4 is a schematic diagram of a second embodiment of a polyphase motor according to the present invention.
Figure 5:
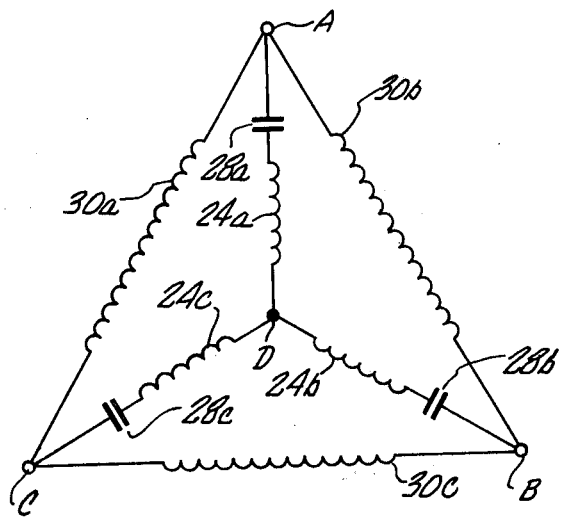
FIG. 5 is a schematic diagram of a third embodiment of a polyphase motor according to the present invention.
Figure 6:
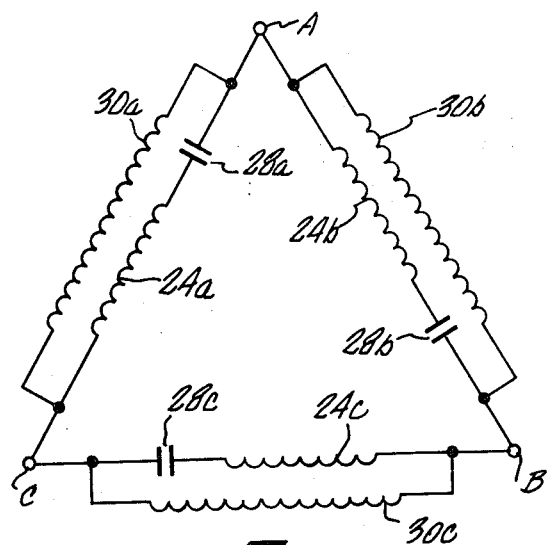
FIG. 6 is a schematic diagram of a fourth embodiment of a polyphase motor according to the present invention.

It is not believed that any extended discussion of the embodiments of FIGS. 3 through 8 is necessary as their characteristics, construction and operation will be obvious to one skilled in the art in view of the foregoing description of the single phase embodiment of the motor of the present invention. Briefly, FIG. 3 shows a three phase motor in which the stator and auxiliary windings are wound in a double wye configuration; FIG. 4 shows the main stator coils 24a, 24b and 24c connected in a delta configuration with the auxiliary coils 30a, 30b and 30c connected in a wye configuration; FIG. 5 shows the main stator coils connected in a wye configuration with the auxiliary windings connected in a delta configuration; and FIG. 6 shows these windings wound in a double delta configuration.

Figure 7:
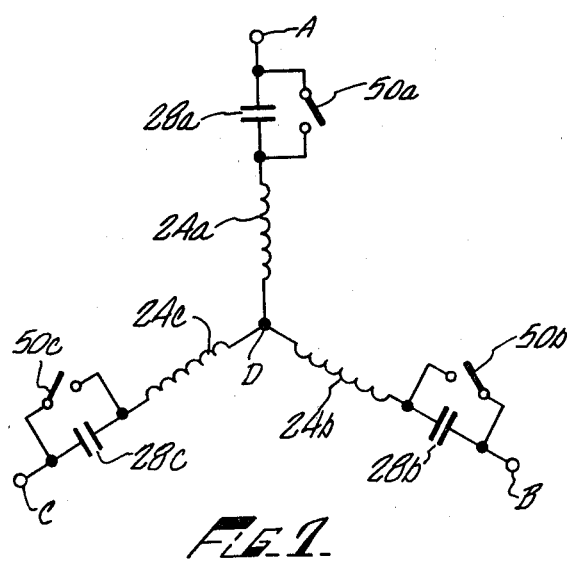
FIG. 7 is a schematic diagram of a fifth embodiment of a polyphase motor according to the present invention.
Figure 8:
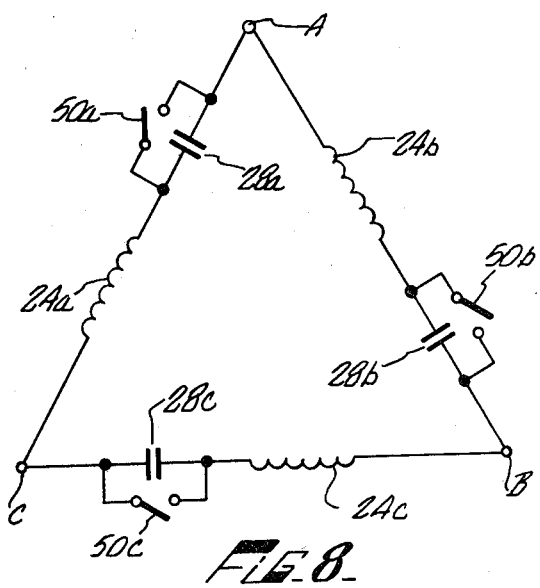
FIG. 8 is a schematic diagram of a sixth embodiment of a polyphase motor according to the present invention.

FIGS. 7 and 8 are embodiments of the invention in which no auxiliary windings are used, FIG. 7 showing the main stator coils being connected in a wye configuration and FIG. 8 showing these coils being connected in a delta configuration. In each of FIGS. 7 and 8 the capacitors 28a, 28b and 28c are shown as being shunted by switching 50a, 50b and 50c. These switches are preferably centrifugally operated so that they are closed when the motor is starting and coming up to speed, and opened at normal running speed. By shorting out the capacitors during starting, the motor is permitted to operate as a conventional polyphase motor during starting so that it will have a starting torque equivalent to conventional motors. Upon approaching running speed, the shunt paths around the capacitors will be opened and the motor will go into the operating mode as previously described. If low starting torque can be accommodated, the switches 50a, 50b and 50c can be eliminated.

No attempt has been made to illustrate the manner in which the three coils of the polyphase main stator winding would be physically wound on the stator core as any conventional technique such as lap winding or wave winding would be satisfactory as will be readily apparent to one skilled in the art. Similarly, the construction of the rotor has not been illustrated as any suitable rotor, i.e., a squirrel cage or wound rotor could be used.

It should be understood that while the foregoing description of the operation of the motor is believed to best describe the physical phenomena present in its operation, it is not meant in any way to limit the scope of the present invention, and that the operation of the motor may some day be better explained. It should also be understood that the invention is not limited to the particular physical constructions of the motor illustrated and described. The foregoing description is thus meant to be illustrative and exemplary only and not restrictive.

I claim:

1. A polyphase electric motor comprising:
a stator including a core of magnetic material;
a rotor;
a main polyphase stator winding wound on said core and encompassing said magnetic material, said winding comprising a plurality of coils, each coil representing a single phase;
a plurality of input terminals adapted to be connected to a source of polyphase AC voltage;
a plurality of capacitors; and
means connecting each of said coils in a series circuit with one of said capacitors and said series circuits being connected with said input terminals;
each of said capacitors being capable of being charged to a voltage sufficient, when added to said AC voltage, to develop a volt-second value across the magnetic material of said stator core greater than the volt-second capacity of said magnetic material so that said magnetic material will periodically be driven into saturation in opposite directions upon changes in polarity of the phases of said polyphase AC voltage.

2. The motor of claim 1 in which switch means are provided in shunt with each of said capacitors.

3. The motor of claim 2 in which said switch means are centrifugally operated and are closed at starting.

4. The motor of claim 1 in which said coils and their associated capacitors are connected in a wye configuration.

5. The motor of claim 1 in which said coils and their associated capacitors are connected in a delta configuration.

6. The motor of claim 1 in which at least one auxiliary winding is wound on said core to encompass said magnetic material and connected to a pair of said input terminals.

7. A polyphase electric motor comprising:
a stator including a core of magnetic material;
a rotor;
a main polyphase stator winding wound on said core and encompassing said magnetic material, said winding comprising a plurality of coils, each coil representing a single phase;
a plurality of input terminals adapted to be connected to a source of polyphase AC voltage;
a plurality of capacitors;
means connecting each of said coils in a series circuit with one of said capacitors, and said series circuits being connected in a wye configuration with said input terminals, and said capacitors being capable of being charged so that the stator core will periodically change nonlinearly from a non-saturated to a saturated condition, and
an auxiliary polyphase auxiliary winding comprising a plurality of coils with each coil representing a single phase, said coils of the auxiliary winding being connected in a wye configuration with said input terminals.

8. A polyphase electric motor comprising:
a stator including a core of magnetic material;
a rotor;
a main polyphase stator winding wound on said core and encompassing said magnetic material, said winding comprising a plurality of coils, each coil representing a single phase;
a plurality of input terminals adapted to be connected to a source of polyphase AC voltage;
a plurality of capacitors;
means connecting each of said coils in a series circuit with one of said capacitors, and said series circuits being connected in a delta configuration with said input terminals, and said capacitors being capable of being charged so that the stator core will periodically change nonlinearly from a nonsaturated to a saturated condition, and
an auxiliary polyphase auxiliary winding comprising a plurality of coils with each coil representing a single phase, said coils of the auxiliary winding being connected in a delta configuration with said input terminals.

9. A polyphase electric motor comprising:
a stator including a core of magnetic material;
a rotor;
a main polyphase stator winding wound on said core and encompassing said magnetic material, said winding comprising a plurality of coils, each coil representing a single phase;
a plurality of input terminals adapted to be connected to a source of polyphase AC voltage;
a plurality of capacitors;
means connecting each of said coils in a series circuit with one of said capacitors, and said series circuits being connected in a delta configuration with said input terminals, and
an auxiliary polyphase auxiliary winding comprising a plurality of coils with each coil representing a single phase, said coils of the auxiliary winding being connected in a wye configuration with said input terminals.

10. An electric motor as in claim 9 wherein each of said capacitors is capable of being charged so that the stator core will periodically change nonlinearly from a non-saturated to a saturated condition.

11. A polyphase electric motor comprising:
a stator including a core of magnetic material;
a rotor;
a main polyphase stator winding wound on said core and encompassing said magnetic material, said winding comprising a plurality of coils, each coil representing a single phase;
a plurality of input terminals adapted to be connected to a source of polyphase AC voltage;
a plurality of capacitors;
means connecting each of said coils in a series circuit with one of said capacitors, and said series circuits being connected in a wye configuration with said input terminals, and
an auxiliary polyphase auxiliary winding comprising a plurality of coils with each coil representing a single phase, said coils of the auxiliary winding being connected in a delta configuration with said input terminals.

12. An electric motor as in claim 11 wherein each of said capacitors is capable of being charged so that the stator core will periodically change nonlinearly from a non-saturated to a saturated condition.

13. A polyphase electric motor comprising:
a stator including a core of magnetic material;
a rotor;
a main polyphase stator winding wound on said core and encompassing said magnetic material, said winding comprising a plurality of coils, each coil representing a single phase;
a plurality of input terminals adapted to be connected to a source of polyphase AC voltage;
a plurality of capacitors;
means connecting each of said coils in a series circuit with one of said capacitors and said series circuits being connected with said input terminals;
each of said capacitors being capable of being charged to a voltage sufficient, when added to said AC voltage, to develop a volt-second value across the magnetic material of said stator core greater than the volt-second capacity of said magnetic material so that said magnetic material will periodically be driven into saturation in opposite directions upon changes in polarity of the phases of said polyphase AC voltage;
said coils and their associated capicators being connected to said input terminals in a wye configuration; and
a plurality of auxiliary windings wound on said core to encompass said magnetic material, each of said auxiliary windings being connected in parallel with one of said series circuits.

14. A polyphase electric motor comprising:
a stator including a core of magnetic material;
a rotor;
a main polyphase stator winding wound on said core and encompassing said magnetic material, said winding comprising a plurality of coils, each coil representing a single phase;
a plurality of input terminals adapted to be connected to a source of polyphase AC voltage;
a plurality of capacitors;
means connecting each of said coils in a series circuit with one of said capacitors and said series circuits being connected with said input terminals;
each of said capacitors being capable of being charged to a voltage sufficient, when added to said AC voltage, to develop a volt-second value across the magnetic material of said stator core greater than the volt-second capacity of said magnetic material so that said magnetic material will periodically be driven into saturation in opposite directions upon changes in polarity of the phases of said polyphase AC voltage;
said coils and their associated capacitors being connected to said input terminals in a delta configuration; and
a plurality of auxiliary windings being wound on said core to encompass said magnetic material, each of said auxiliary winding being connected in parallel with one of said series circuits.

15. A polyphase electric motor comprising:
a stator including a core of magnetic material;
a rotor;
a main polyphase stator winding wound on said core and encompassing said magnetic material, said winding comprising a plurality of coils, each coil representing a single phase;
a plurality of input terminals adapted to be connected to a source of polyphase AC voltage;
a plurality of capacitors;
means connecting each of said coils in a series circuit with one of said capacitors and said series circuits being connected with said input terminals;
each of said capacitors being capable of being charged to a voltage sufficient, when added to said AC voltage, to develop a volt-second value across the magnetic material of said core greater than the volt-second capacity of said magnetic material so that said magnetic material will periodically be driven into saturation in opposite directions upon changes in polarity of the phases of said polyphase AC voltage; and
a plurality of auxiliary windings wound on said core to encompass said magnetic material, said coils and their associated capacitors being connected to said input terminals in a wye configuration and said auxiliary windings being connected to said input terminals in a delta configuration.

16. A polyphase electric motor comprising:
a stator including a core of magnetic material;
a rotor;
a main polyphase stator winding wound on said core and encompassing said magnetic material, said winding comprising a plurality of coils, each coil representing a single phase;
a plurality of input terminals adapted to be connected to a source of polyphase AC voltage;
a plurality of capacitors;
means connecting each of said coils in a series circuit with one of said capacitors and said series circuits being connected with said input terminals;
each of said capacitors being capable of being charged to a voltage sufficient, when added to said AC voltage, to develop a volt-second value across the magnetic material of said stator core greater than the volt-second capacity of said magnetic material so that said magnetic material will periodically be driven into saturation in opposite directions upon changes in polarity of the phases of said polyphase AC voltage; and a plurality of auxiliary windings wound on said core to encompass said magnetic material, said coils and their associated capacitors being connected to said input terminals in a delta configuration and said auxiliary windings being connected to said input terminals in a wye configuration.

17. A polyphase electric motor comprising:
a stator including a core of magnetic material;
a rotor;
a main polyphase stator winding wound on said core and encompassing said magnetic material, said winding comprising a plurality of coils, each coil representing a single phase;
a plurality of input terminals adapted to be connected to a source of polyphase AC voltage;
a plurality of capacitors;
means connecting each of said coils in a series circuit with one of said capacitors and said series circuits being connected with said input terminals, said capacitors being capable of being charged so that the stator core will periodically change nonlinearly from nonsaturated to a saturated condition;
said coils and their associated capacitors being connected to said input terminals in a wye configuration; and
a plurality of auxiliary windings being wound on said core to encompass said magnetic material, each of said auxiliary windings being connected and parallel to one of said series circuits.

18. A polyphase electric motor comprising:
a stator including a core of magnetic material;
a rotor;
a main polyphase stator winding wound on said core and encompassing said magnetic material, said winding comprising a plurality of coils, each coil representing a single phase;
a plurality of input terminals adapted to be connected to a source of polyphase AC voltage;
a plurality of capacitors;
means connecting each of said coils in a series circuit with one of said capacitors and said series circuits being connected with said input terminals, said capacitors being capable of being charged so that the stator core will periodically change nonlinearly from a nonsaturated to a saturated condition;
said coils and their associated capacitors being connected to said input terminals in a delta configuration; and
a plurality of auxiliary windings being wound on said core to encompass said magnetic material, each of said auxiliary windings being connected in parallel with one of said series circuits.

19. A polyphase electric motor comprising:
a stator including a core of magnetic material;
a rotor;
a main polyphase stator winding wound on said core and encompassing said magnetic material, said winding comprising a plurality of coils, each coil representing a single phrase;
a plurality of input terminals adapted to be connected to a source of polyphase AC voltage;
a plurality of capacitors;
means connecting each of said coils in a series circuit with one of said capacitors and said series circuits being connected with said input terminals, said capacitors being capable of being charged so that the stator core will periodically change nonlinearly from a nonsaturated to a saturated condition; and a plurality of auxiliary windings being wound on said core to encompass said magnetic material, said coils and their associated capacitors being connected to said input terminals in a wye configuration and said auxiliary windings being connected to said input terminals in a delta configuration.

20. A polyphase electric motor comprising:
a stator including a core of magnetic material;
a rotor;
a main polyphase stator winding wound on said core and encompassing said magnetic material, said winding comprising a plurality of coils, each coil representing a single phase;
a plurality of input terminals adapted to be connected to a source of polyphase AC voltage;
a plurality of capacitors;
means connecting each of said coils in a series circuit with one of said capacitors and said series circuits being connected with said input terminals, said capacitors being charged so that the stator core will periodically change nonlinearly from a nonsaturated to a saturated condition; and
a plurality of auxiliary windings being wound on said core to encompass said magnetic material, said cores and their associated capacitors being connected to said input terminals in a delta configuration and said auxiliary windings being connected to said input terminals, in a wye configuration.

21. A polyphase electric motor comprising:
a stator including a core of magnetic material;
a rotor;
a main polyphase stator winding wound on said core and encompassing said magnetic material, said winding comprising a plurality of coils, each coil representing a single phase;
a plurality of input terminals adapted to be connected to a source of polyphase AC voltage;
a plurality of capacitors;
means connecting each of said coils in a series circuit with one of said capacitors and said series circuits being connected with said input terminals; and
an auxiliary winding wound on said core and encompassing said magnetic material to function as a generator winding to counteract, when the back e.m.f. exceeds input voltage, some of the current drawn by the main polyphase stator winding, said auxiliary winding being connected with said input terminals and comprising at least one coil.

22. An electric motor as in claim 21 wherein:
said auxiliary winding comprises a plurality of coils with each coil representing a single phase.

23. An electric motor as in either claim 21 or claim 22 wherein the capacitors are capable of being charged so that the stator core will periodically change nonlinearly from a nonsaturated to a saturated condition.

24. A polyphase electric motor comprising:
a stator including a core of magnetic material;
a rotor;
a main polyphase stator winding wound on said core and encompassing said magnetic material, said winding comprising a plurality of coils, each coil representing a single phase;
a plurality of input terminals adapted to be connected to a source of polyphase AC voltage;
a plurality of capacitors;

means connecting each of said coils in a series circuit with one of said capacitors and said series circuits being connected with said input terminals;

each of said capacitors being capable of being charged to a voltage sufficient, when added to said AC voltage, to develop a volt-second value across the magnetic material of said stator core greater than the volt-second capacity of said magnetic core so that said magnetic material will periodically be driven into saturation in opposite directions upon changes in polarity of the phases of said polyphase AC voltage; and an auxiliary winding wound on said core and encompassing said magnetic material to function as a generator winding to counteract, when the back e.m.f. exceeds input voltage, some of the current drawn by the main polyphase stator winding, said auxiliary winding being connected with said input terminal and comprising at least one coil.

25. An electric motor as claimed in claim 24 wherein: said auxiliary winding comprises a plurality of coils with each coil representing a single phase.

26. A motor as claimed in claim 2 wherein said coils and their associated capacitors are connected in wye configuration.

27. A motor as claimed in claim 2 wherein said coils and their associated capacitors are connected in delta configuration.

28. A motor as claimed in claim 6 wherein the auxiliary winding has a higher inductance than each of said coils of the stator windings.

29. A motor as claimed in claim 27, wherein each auxiliary winding has a higher inductance than the coil of the stator winding representing each respective phase.

30. A motor as claimed in claim 28, wherein each auxiliary winding has a higher inductance than the coil of the stator winding representing each respective phase.

31. A motor as claimed in claim 29, wherein each auxiliary winding has a higher inductance than the coil of the stator winding representing each respective phase.

32. A motor as claimed in claim 30, wherein each auxiliary winding has a higher inductance than the coil of the stator winding representing each respective phase.

33. A motor as claimed in claim 31 wherein each auxiliary winding has a higher inductance than the coil of the stator winding representing each respective phase.

34. A motor as claimed in claim 32 wherein each auxiliary winding has a higher inductance than the coil of the stator winding representing each respective phase.

35. A motor as claimed in claim 33 wherein each auxiliary winding has a higher inductance than the coil of the stator winding representing each respective phase.

36. A motor as claimed in claim 34 wherein each auxiliary winding has a higher inductance than the coil of the stator winding representing each respective phase.

37. A motor as claimed in claim 23 wherein each auxiliary winding has a higher inductance than the coil of the stator winding representing each respective phase.

38. A motor as claimed in claim 25 wherein each auxiliary winding has a higher inductance than the coil of the stator winding representing each respective phase.

39. A motor as claimed in claim 1 wherein the respective capacitors have a capacitance large enough to maintain capacitive power factors in the respective series circuits defined by the respective coils of the main stator winding and the capacitors.

40. A motor as claimed in claim 2 wherein the respective capacitors have a capacitance large enough to maintain capacitive power factors in the respective series circuits defined by the respective coils of the main stator winding and the capacitors.

41. A motor as claimed in claim 4 wherein the respective capacitors have a capacitance large enough to maintain capacitive power factors in the respective series circuits defined by the respective coils of the main stator winding and the capacitors.

42. A motor as claimed in claim 5 wherein the respective capacitors have a capacitance large enough to maintain capacitive power factors in the respective series circuits defined by the respective coils of the main stator winding and the capacitors.

43. A motor as claimed in claim 23 wherein the respective capacitors have a capacitance large enough to maintain capacitance power factors in the respective series circuits defined by the respective coils of the main stator winding and the capacitors.

44. A motor as claimed in claim 25 wherein the respective capacitors have a capacitance large enough to maintain capacitive power factors in the respective series circuits defined by the respective coils of the main stator winding and the capacitors.

45. A motor as claimed in claim 27 wherein the respective capacitors have a capacitance large enough to maintain capacitive power factors in the respective series circuits defined by the respective coils of the stator winding and the capacitors.

46. A motor as claimed in claim 28 wherein the respective capacitors have a capacitance large enough to maintain capacitive power factors in the respective series circuits defined by the respective coils of the main stator winding and the capacitors.

47. A motor as claimed in claim 29 wherein the respective capacitors have a capacitance large enough to maintain capacitive power factors in the respective series circuits defined by the respective coils of the main stator winding and the capacitors.

48. A motor as claimed in claim 30 wherein the respective capacitors have a capacitance large enough to maintain capacitive power factors in the respective series circuits defined by the respective coils of the main stator winding and the capacitors.

49. A motor as claimed in claim 31 wherein the respective capacitors have a capacitance large enough to maintain capacitive power factors in the respective series circuits defined by the respective coils of the main stator winding and the capacitors.

50. A motor as claimed in claim 32 wherein the respective capacitors have a capacitance large enough to maintain capacitive power factors in the respective series circuits defined by the respective coils of the main stator winding and the capacitor.

51. A motor as claimed in claim 33 wherein the respective capacitors have a capacitance large enough to maintain capacitive power factors in the respective series circuits defined by the respective coils of the main stator winding and the capacitors.

52. A motor as claimed in claim 34 wherein the respective capacitors have a capacitance large enough to maintain capacitive power factors in the respective series circuits defined by the respective coils of the main stator winding and the capacitors.

* * * * *